United States Patent [19]
Davis et al.

[11] Patent Number: 6,088,450
[45] Date of Patent: *Jul. 11, 2000

[54] AUTHENTICATION SYSTEM BASED ON PERIODIC CHALLENGE/RESPONSE PROTOCOL

[75] Inventors: Derek L. Davis, Phoenix; Lionel Smith, Queen Creek, both of Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/634,068

[22] Filed: Apr. 17, 1996

[51] Int. Cl.[7] .................................. H04L 9/32; G07F 7/08
[52] U.S. Cl. .................... 380/25; 380/23; 340/825.31; 340/325.34; 235/380; 235/382
[58] Field of Search .................................. 380/23, 25, 24, 380/49, 50, 59, 29, 30; 340/825.31, 825.34; 235/379, 380, 382

[56] References Cited

U.S. PATENT DOCUMENTS

| | | | |
|---|---|---|---|
| 4,260,982 | 4/1981 | Debenedictis et al. ............... | 380/23 X |
| 4,271,482 | 6/1981 | Giraud . | |
| 4,310,720 | 1/1982 | Check, Jr. . | |
| 4,467,139 | 8/1984 | Mollier . | |
| 4,638,120 | 1/1987 | Herve . | |
| 4,811,393 | 3/1989 | Hazard ..................... | 380/21 |
| 4,817,140 | 3/1989 | Chandra et al. ............. | 380/4 |
| 4,860,352 | 8/1989 | Laurance et al. .......... | 380/23 |
| 4,905,277 | 2/1990 | Nakamura .................... | 380/4 |
| 4,907,270 | 3/1990 | Hazard ..................... | 380/23 |
| 5,005,200 | 4/1991 | Fischer ..................... | 380/30 |
| 5,097,505 | 3/1992 | Weiss ........................ | 380/23 |
| 5,131,038 | 7/1992 | Puhl et al. ................. | 380/23 |
| 5,140,634 | 8/1992 | Guillou et al. ............. | 380/23 |
| 5,144,667 | 9/1992 | Pogue, Jr. et al. ........... | 380/45 |
| 5,218,637 | 6/1993 | Angebaud et al. ......... | 380/23 |
| 5,280,527 | 1/1994 | Gullman et al. ........... | 380/23 |
| 5,293,424 | 3/1994 | Holtey et al. ............... | 380/23 |
| 5,323,465 | 6/1994 | Avarne ........................ | 380/23 |
| 5,355,414 | 10/1994 | Hale et al. ................... | 380/25 |
| 5,377,269 | 12/1994 | Heptig et al. ............... | 380/25 |
| 5,381,480 | 1/1995 | Butter et al. ............... | 380/37 |
| 5,432,851 | 7/1995 | Scheidt et al. ............. | 380/25 |
| 5,473,692 | 12/1995 | Davis ........................ | 380/23 |
| 5,539,828 | 7/1996 | Davis ........................ | 380/30 |
| 5,568,552 | 10/1996 | Davis ........................ | 380/3 |
| 5,583,486 | 12/1996 | Kersten ..................... | 340/568 |
| 5,633,932 | 5/1997 | Davis et al. ............... | 380/3 |
| 5,648,763 | 7/1997 | Long .......................... | 340/825.31 X |
| 5,796,840 | 8/1998 | Davis ........................ | 380/50 |
| 5,805,706 | 9/1998 | Davis ........................ | 380/4 |
| 5,805,712 | 9/1998 | Davis ........................ | 380/4 |

Primary Examiner—Bernarr E. Gregory
Attorney, Agent, or Firm—Blakely, Sokoloff, Taylor & Zafman LLP

[57] ABSTRACT

A wireless authentication system to control an operating state of a node being a computer, door control mechanism or any muti-state product based on the proximity of an authorized user to the node. The wireless authentication system comprises a security device implemented within the computer and a user authentication token ("token") in possession of the authorized user. A Challenge/Response protocol is configured between the security device and the token. The first successful Challenge/Response message exchange between the security device and the token places the node in an operational state allowing the authorized user access to the contents and/or networked resources of the node. Later Challenge/Response message exchanges are set to occur periodically to check whether the authorized user possessing the token has left the node unattended thereby causing the node to be placed in a non-operational state.

47 Claims, 6 Drawing Sheets

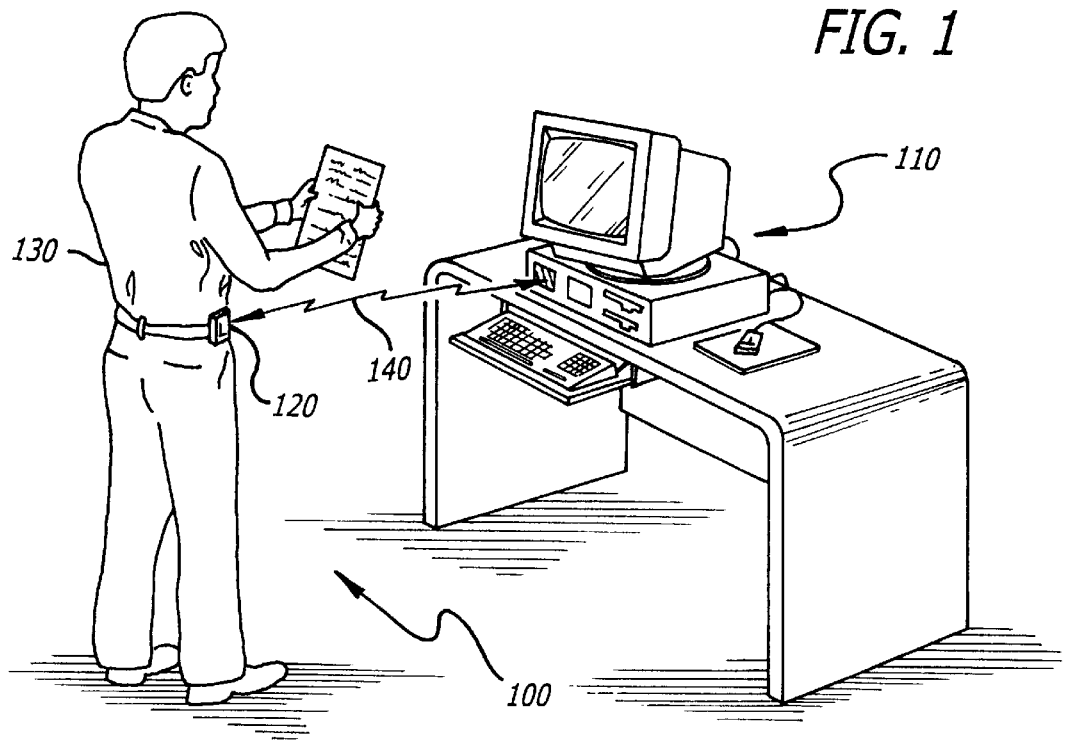
FIG. 1
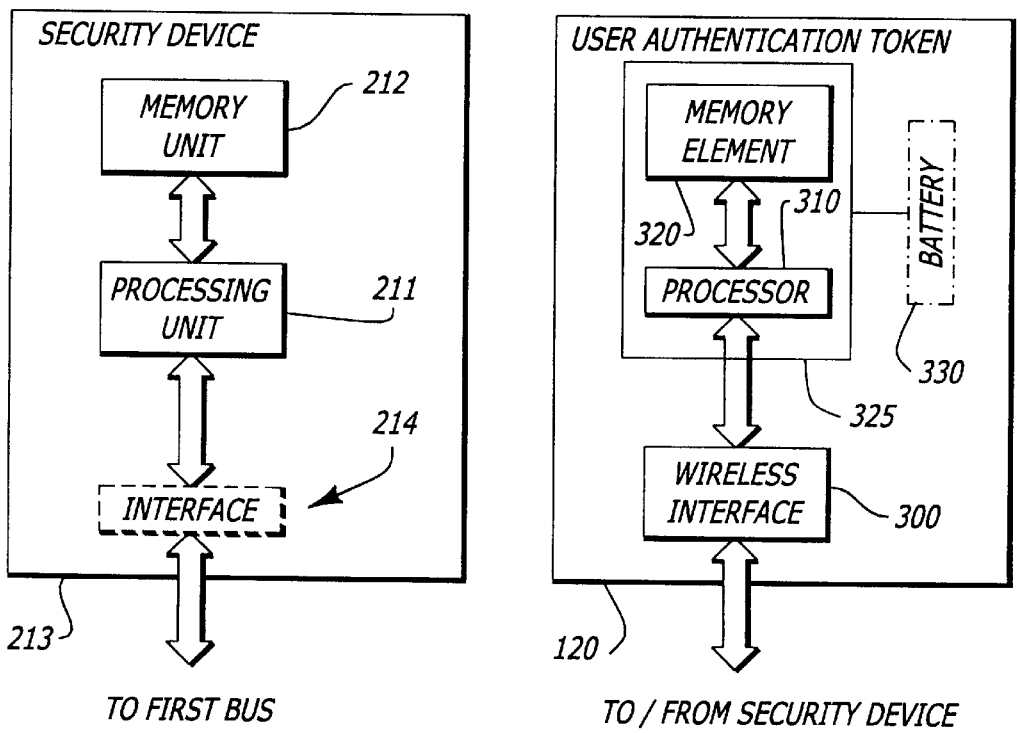
FIG. 3
FIG. 4

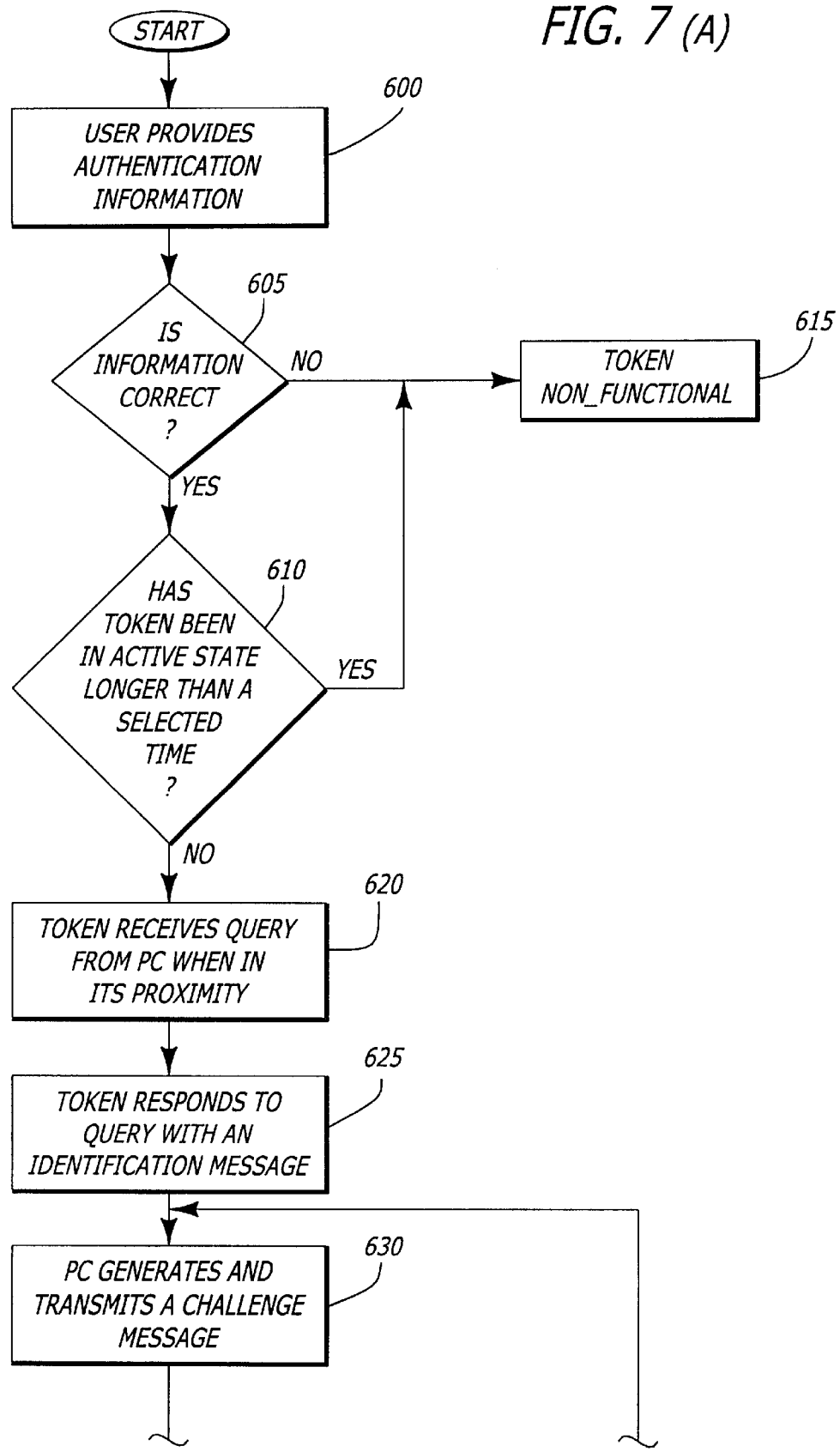

AUTHENTICATION SYSTEM BASED ON PERIODIC CHALLENGE/RESPONSE PROTOCOL

CROSS-REFERENCES TO RELATED APPLICATIONS

Derek L. Davis, a named inventor of the present application, has a previously filed United States Patent Application entitled "Apparatus and Method for a Vetted Field Upgrade" (application Ser. No. 08/847,926, filed Apr. 28, 1997 which is a continuation of U.S. Pat. No. 08/316,211 filed Sep. 30, 1994, now abandoned), and issued U.S. Patents entitled "Apparatus and Method for Providing Secured Communications" (U.S. Pat. No. 5,805,712), "Secured Method for Providing Secured Communications" (U.S. Pat. No. 5,796,840), and "Method for Providing a Roving Software License in a Hardware Agent-Based System (U.S. Pat. No. 5,568,552). These applications are owned by the same assignee of the present Application.

BACKGROUND OF THE INVENTION

1. Field of the Invention

The present invention relates to data security. More particularly, the present invention relates to a wireless authentication system which mitigates the likelihood of unauthorized use of an electronic device through periodic challenge/response messages.

2. Description of Art Related to the Invention

As personal computers ("PCs") become more prevalent in businesses throughout the world, it is becoming increasingly important to provide security to prevent their unauthorized use. Already, there exist a number of authentication systems which provide marginally effective security of one's personal computer. For example, one well-known type of conventional authentication system is a "password-based" system in which a person is allowed access to the contents of and resources networked to a personal computer by correctly typing in a previously chosen password. However, password-based systems are susceptible to (i) software which can be used to capture the person's password and to (ii) common "human" mistakes such as confiding one's password to another or using the same password for a long period of time. Moreover, password-based systems do not provide any mechanism for mitigating the risk of unauthorized use of one's personal computer in those situations where the user fails to turn-off his or her personal computer before leaving work or has to leave his or her office for a moment (e.g., lunch, attend a meeting, etc.) but leaves his or her personal computer running i.e., in an operational state.

Another example is a password protected screen saver which automatically turns off one's computer if it is not used for a predetermined period of time. This authentication system is usually disruptive to the user because its state is dependent on whether or not the user is using the computer, not the proximity of the user to the computer. Thus, if the user is on the phone for a while, the computer may be mistakenly turned off requiring the user to log-in again. Thus, users commonly set the "time-out" of the screen saver for a long duration which defeats its objective to protect the contents of the computer when the user has left his or her office without turning off the computer.

Another marginally effective authentication system is a "card-based" system in which a "smartcard" card being an integrated circuit carried in a credit card form factor, PCM-CIA card or magnetic stripped card (hereinafter generally referred to as "token cards") is used to gain physical and/or electrical access to the personal computer. Normally, token cards may be either inserted into a designated card slot of the personal computer, placed in physical contact with a reading device coupled to the computer or placed in an area where the personal computer resides (e.g., an office, laboratory and the like). These token cards are used to verify that the person in possession of the card is in fact authorized to use the personal computer. Depending on the type of token card, such verification is accomplished by the token card responding to a request (i.e., "Challenge message") for information by providing a "token" (i.e. code), normally a random number although it may be static, in response to the challenge issued by the personal computer. In the case of a more sophisticated token card, this request will be in the form of a random "challenge" which the token card must first process in order to provide the correct "response". Although this type of authentication system arguably provides greater security than the password-based system, it still does not solve the problem where the user accesses his or her personal computer and leaves the personal computer unattended for some duration without removing the card or disabling the personal computer during his or her absence.

Hence, it is desirable to develop a wireless authentication system which does not require a physical connection to the personal computer, thereby mitigating the chances of mistakenly leaving one's token card within or in proximity of one's computer. While there now exist some authentication systems in the marketplace such as those provided by Security Dynamics, Inc. of Cambridge, Mass. and Digital Pathways of Mountain View, Calif., their systems do not utilize periodic Challenge/Response protocol to ascertain whether the authorized user of the personal computer has left his or her personal computer unattended for a predetermined period of time.

SUMMARY OF THE INVENTION

A wireless authentication system to control an operating state of a first node (e.g., computer) based on the proximity of an authorized user to the first node. The wireless authentication system comprises a security device implemented within the first node and a user authentication token in possession of the authorized user (e.g., worn, carried, etc.). The security device generates a Challenge message and transmits the same to the token. In response, the token generates and transmits a Response message to the security device if the token is within a predetermined distance from the security device. Thereafter, the authorized user can access the first node because it is in an operational state.

Subsequently, the security device generates and transmits other Challenge messages at selected intervals to check whether the authorized user normally wearing the token has left the first node unattended. If the token responds correctly indicating that the token is still proximate to the first node, the first node is maintained in its operational state. Otherwise, the first node enters into a non-operational state disallowing further access thereto.

BRIEF DESCRIPTION OF THE DRAWINGS

The features and advantages of the present invention will become apparent from the following detailed description of the present invention in which:

FIG. 1 is a perspective view of the wireless authentication system comprising a personal computer periodically producing a Challenge message to query the proximity of the user and his or her token as well as the token producing a Response message in response to the Challenge message.

FIG. 3 is a block diagram of an illustrative embodiment of the security device employed within a node as shown in FIG. 2.

FIG. 4 is a block diagram of an illustrative embodiment of the token of FIG. 1.

DESCRIPTION OF THE PREFERRED EMBODIMENT

Figure 2:
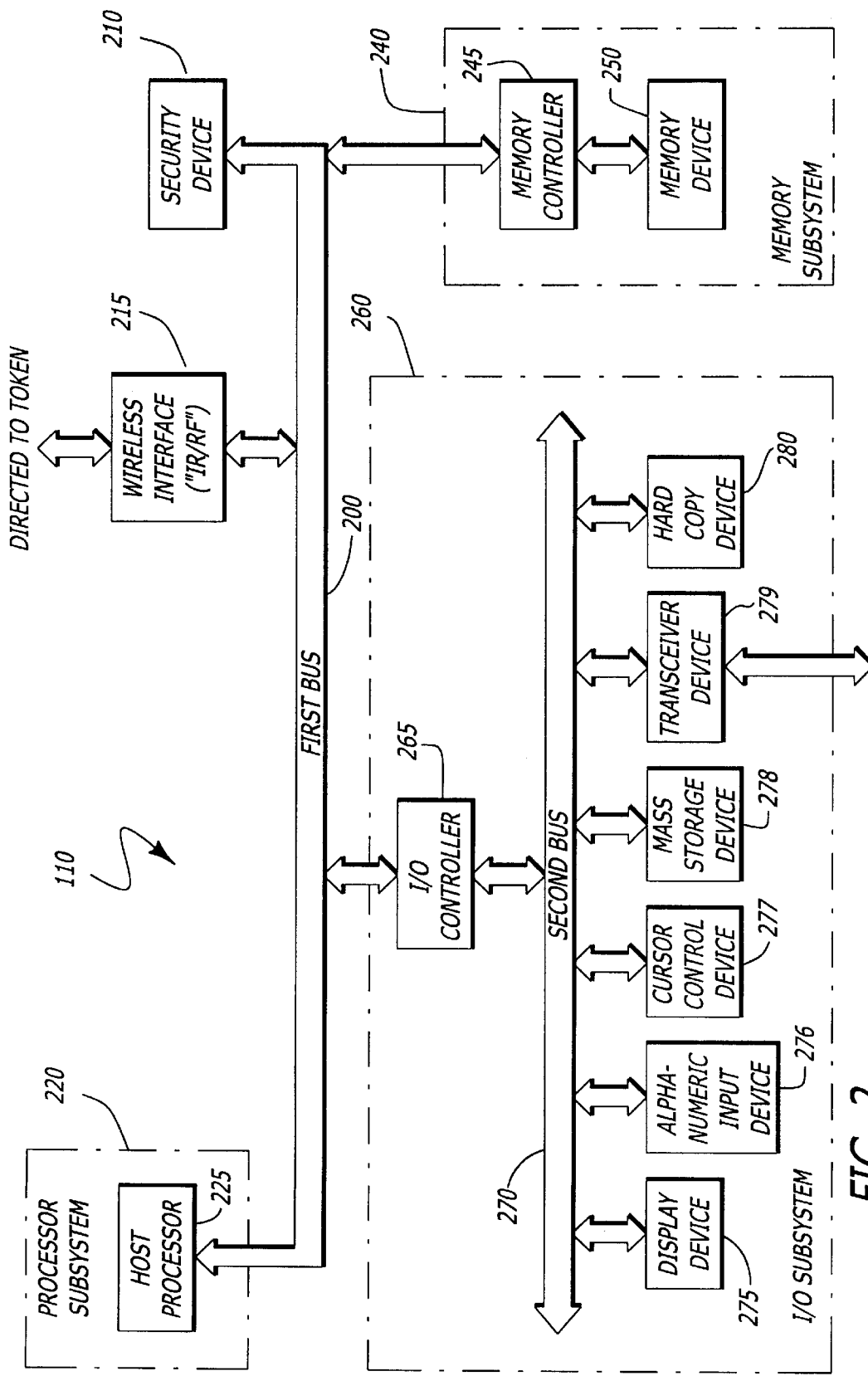
FIG. 2 is a block diagram of the general architecture of the personal computer of FIG. 1.

The present invention relates to a wireless authentication system which provides and maintains a node in an operational state only when, through periodic bi-directional communications, it ascertains whether an individual wearing a user authentication token is within a predetermined (approximate) distance from the node. In the following description, numerous specific details are set forth but it is appreciated to one skilled in the art that these exact details are not required to practice the present invention. Likewise, certain well-known components, devices and method steps are not set forth in detail to avoid unnecessarily obscuring the present invention.

Herein, certain well-known terminology is generally defined below. For example, a "message" is generally defined as information (e.g., data, address, encrypted keys and any other information) being transferred in a sequence of one or more cycles. Two common types of messages are a "Challenge" message and a "Response" message collectively authenticating the user of the node and his or her whereabouts. A "key" is an encoding and/or decoding parameter used by cryptographic algorithms such as Rivest, Shamir and Adleman ("RSA") which use public and private key pairs and Data Encryption Algorithm ("DES") which use a secret key shared in confidence between two parties. A "digital certificate" is defined as any digital information (e.g., a public key) encrypted of a private key of a widely known trusted authority (e.g., bank, governmental entity, trade association, equipment manufacturer, company security, system administration, etc.) to securely transmit the digital information between two electronic devices.

Referring to FIG. 1, an illustrative embodiment of the wireless authentication system of the present invention is shown. The wireless authentication system 100 features a security device (not shown) implemented within a node (e.g., a personal computer) 110 and a user authentication token ("token") 120 worn by an authorized user 130. The token 120 may be constructed in any form, preferably a form that is not too obtrusive to carry or wear. Examples of forms that can be used by the tokens include, but are not limited to pagers or identification badges. The function may also be implemented in another device with an alternative purpose such as a cellular telephone. The personal computer 110 periodically attempts to establish a communication link 140, represented by dotted lines, with the token 120 through infra-red ("IR") transmissions or through any other medium that does not require physical connection (e.g., radio frequency "RF" signals in which the personal computer 110 may require an antenna). The communication link 140 may be established and maintained only when the token 120 is within a predetermined distance (e.g., within 20 feet) from the personal computer 110. It is contemplated that although the wireless authentication system is being described with a personal computer, it could be implemented to secure any node being an electronic product such as a peripheral to the computer (printer, mass storage device, etc.), door locking mechanisms (i.e., garage door opener, electronic door locks) and the like.

Upon establishing the communication link 140, information is exchanged, normally in an encrypted format in at least one direction, between the security device (not shown) and the token 120. Upon the security device determining that the token 120 responded correctly, the user 130 is granted access to the contents (i.e., data, applications and other information stored thereon) of the personal computer 110 as well as its networked resources.

It is contemplated that the wireless authentication system 100 may be utilized with another authentication system (password-based system, card-based system, etc.) to prevent the personal computer 110 from being mistakenly accessed in certain situations. One situation is where the authorized user 130 wearing the token 120 is walking by the personal computer 110 within the predetermined distance without any intention of using the personal computer 110.

Referring now to FIG. 2, an embodiment of the personal computer 110 featuring the security device of the authentication system is illustrated. The personal computer 110 includes a first bus 200 enabling information to be communicated between a security device 210, a wireless interface 215 and a plurality of subsystems including a processor subsystem 220, a memory subsystem 240 and an input/output ("I/O") subsystem 260. The details of the security device 210 are discussed in FIG. 3 and the wireless interface 215 is a conventional interface which is constructed to transmit and receive messages in an "IR" or perhaps "RF" format.

As further shown in FIG. 2, the processor subsystem 220 includes a host processor 225 illustrated as a single processor but may be employed as multiple processors within the personal computer 110. It is contemplated that the security device 210 is represented as a co-processor but the authentication operations could be performed by the host processor 225, provided there is no concern about virus attack or removal of the chassis of the personal computer to monitor its bus signals. However, since the host processor is an open platform architecture, implementation of the security device 210 itself or its functionality within the host processor 225 would require isolation of the authentication operations from normal operations of the host processor 225.

The memory subsystem 240 includes a memory controller 245 which is coupled to the first bus 200. The memory controller 245 controls the access to at least one memory device 250 such as dynamic random access memory ("DRAM"), read only memory ("ROM"), video random access memory ("VRAM") and the like. The memory device 250 stores data, instructions and other information for use by the host processor 225.

The I/O subsystem 260 includes an I/O controller 265 which is coupled to both the first bus 200 and a second bus 270 (e.g., a Peripheral Component Interconnect "PCI" bus, Industry Standard Architecture "ISA" bus and the like). The I/O controller 265 provides a communication path to allow devices connected to the first bus 200 or the second bus 270 to exchange information. The second bus 270 allows information to be transferred from or to at least one peripheral device including, but not limited to a display device 275 (e.g., cathode ray tube, liquid crystal display, etc.); an alphanumeric input device 276 (e.g., an alphanumeric keyboard, etc.) for communicating information (address, data and control) to the host processor 225; a cursor control device 277 (e.g., a mouse, trackball, joystick, touchpad, etc.); a mass data storage device 278 (e.g., magnetic tapes, hard disk drive, floppy disk drive, etc.); an information transceiver device 279 (fax machine, modem, etc.) for transmitting information from the personal computer 110 to another remotely located device and for receiving information therefrom; and a hard copy device 280 (e.g., plotter, printer, etc.) for providing a tangible, visual representation of the information. It is contemplated that the personal computer shown in FIG. 2 may employ some or all of these devices or different devices than those illustrated. For example, the security device 210 could be coupled to the second bus 270 instead of the first bus 200, a local bus (not shown) within the host processor 225 or may be adapted to any bus line coupling any of the peripheral devices such as the mass storage device 278.

Alternatively, the security device could be utilized for access control purposes outside the computer field such as in the automatic field, home and business security field. It is contemplated that the security device and token combination could be used to authenticate the holder of the token before granting access to a node of transportation (car, bus, farm equipment, etc.) garage, and home or office or any other node by implementing the security device in that node such as within a door control mechanism (e.g., garage door opener, electronic locks, etc.) and the like.

Referring to FIG. 3, one embodiment of the security device 210 is shown. The security device 210 includes a processing unit 211 and a memory unit 212. The processing unit 211 may be a co-processor, micro-controller or any other device having processing capabilities. The memory unit 212 preferably is made of non-volatile memory which is able to contain cryptographic algorithms as well as cryptographic keys (e.g., public key(s) of various tokens, a public key of the widely known trusted authority, a unique public/private key pair, a DES key, etc.). In this embodiment, both the processing unit 211 and the memory unit 212 are implemented in a single integrated circuit package 213 to mitigate the risk of tampering although they may be separately packaged and hardwired together. The security device 210 may include an interface 214 coupling the processor unit 211 to the first bus.

Referring now to FIG. 4, one embodiment of the token 120 is shown. The token 120 comprises a wireless interface 300 to exchange messages, namely Challenge and Response messages with the personal computer or any node. These messages may follow an IR or RF transmission protocol although other types of transmission protocols may be used. The wireless interface 300 is coupled to a processor 310 and a memory element 320, both of which are preferably integrated into one integrated circuit package 325 to reduce vulnerability to physical tampering. The memory element 320 has non-volatile characteristics (either as true non-volatile memory or as RAM with a "permanent" power source such as a battery) and is preferably configured to contain its unique public and private key pair and perhaps a digital certificate to allow the token 120 to securely transmit its public key "PUT" to the security device in the event that the security device is not configured at manufacture with various public keys of tokens whose users are allowed access to the personal computer or its controlling node. It is an option for the token 120 to provide an on-board power source 330 (e.g., a battery) to possibly supply power to components within the token 120 for operational purposes as well as to possibly service the memory element 320 if needed. For some protocol implementations, inclusion of a random number generator may be desirable (particularly where the token is also used to authenticate the personal computer).

Figure 5:
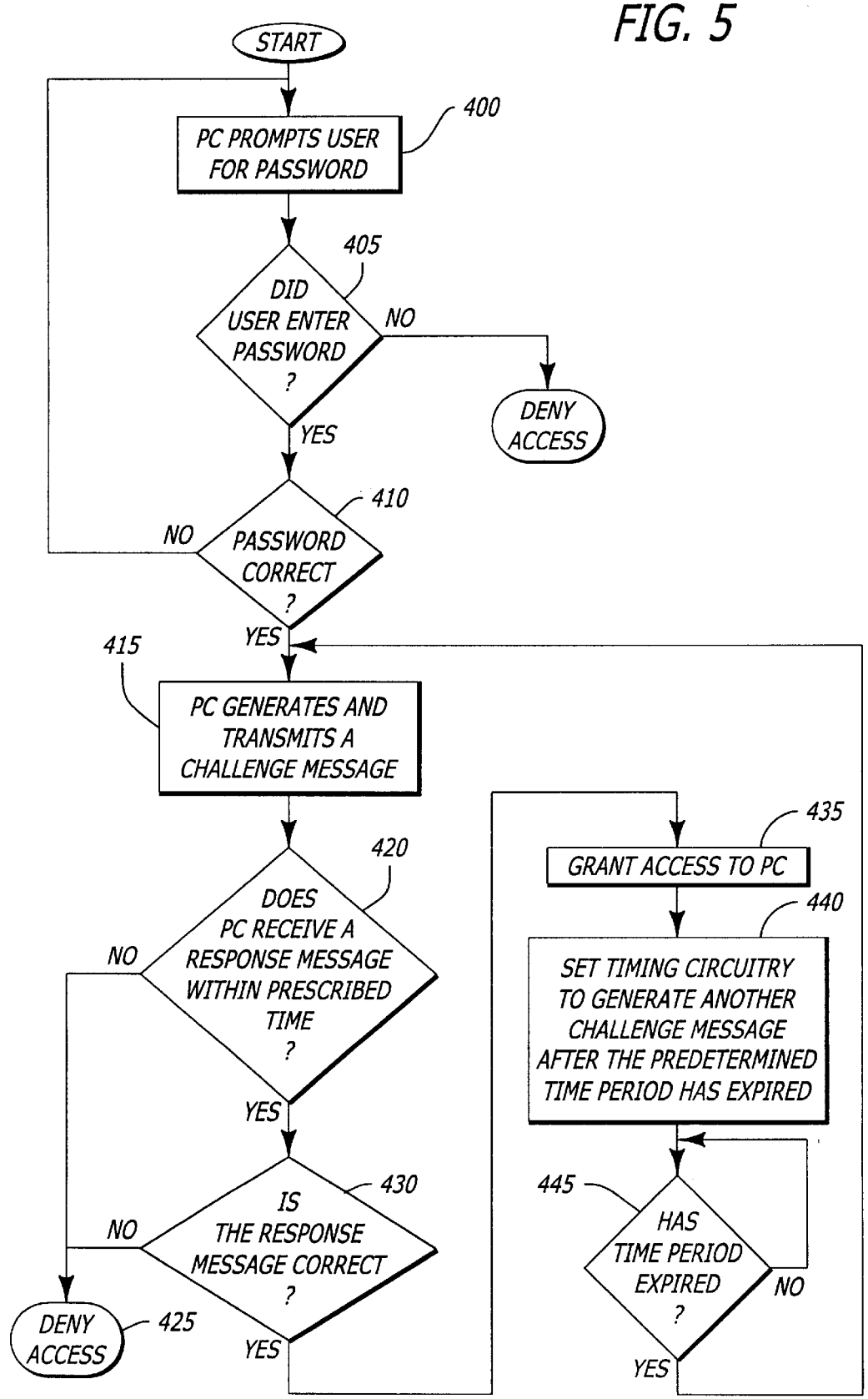
FIG. 5 is a flowchart illustrating the procedural steps undertaken by the wireless authentication system in protecting the integrity of the contents and networked resources of the node through periodic Challenge and Response messages.

Referring to FIG. 5, the operational steps performed by the wireless authentication system in periodically exchanging Challenge and Response messages between a node (e.g., computer, locking mechanism for car doors, home or office door entry, etc.) and the token is illustrated. In this embodiment, the node prompts a user for a password but continues to deny access to its contents and networked resources (Steps 400–405). Upon the user entering his or her password, the node determines whether the password is correct (Step 410). If the password is incorrect, the node prompts the user to re-enter the password. Of course, the node may be configured to allow only one or more tries to enter the password before precluding access to the node without assistance by security (such as a corporate security officer) or imposing a time-delay before one can attempt to try to access the node.

Alternatively, if the password is correct, the node, namely the security device, generates a Challenge message and transmits the Challenge message covering a predetermined distal range from the node (Step 415). Thereafter, it awaits a Response message from the token and its verification before allowing the user access to the content stored on the node or its networked resources (Step 420). If no Response message is received after a prescribed period of time, access is denied (Step 425). Otherwise, upon receiving the Response message, the node verifies whether the Response message is correct (Step 430). If the Response message is incorrect, the user is denied access to the node by any conventional manner such as by displaying a screen-obscuring image, refusing further input from the keyboard, mouse, etc., suspending further I/O to and from the node or suspending any network connections for a computer representing the node. If the Response message is correct, the user is provided access to the node and a timing circuit integrated in the node is set to signal when the node is to generate another Challenge message and undergo another Challenge/Response session (Steps 435–445). This ensures that the node will periodically require authentication and implicitly the proximity of the user from the node before maintaining it in its operational state or placing it in a non-operational state.

Figure 6:
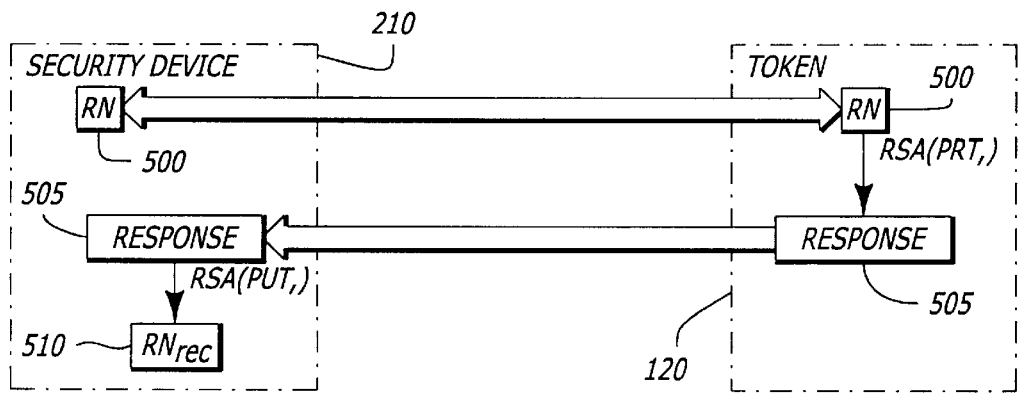
FIGS. 6A–6C are block diagrams of three illustrative embodiments of the Challenge/Response protocol.
Figure 6:
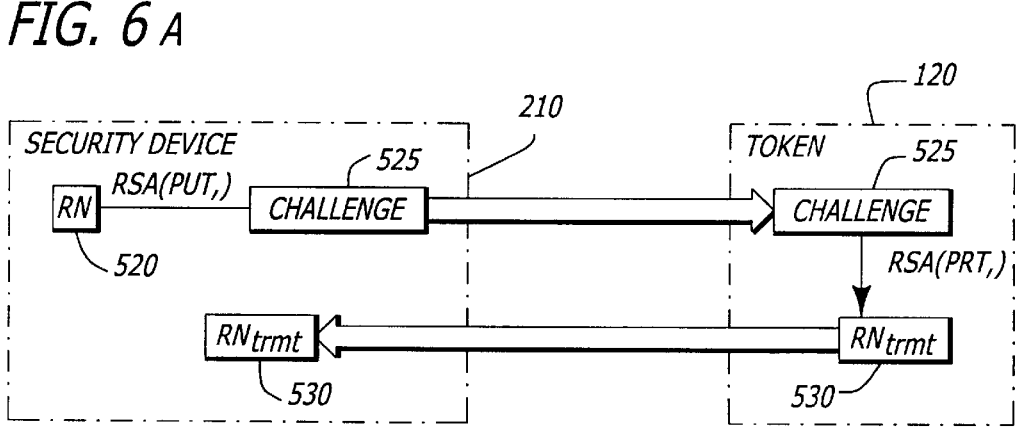
Figure 6:
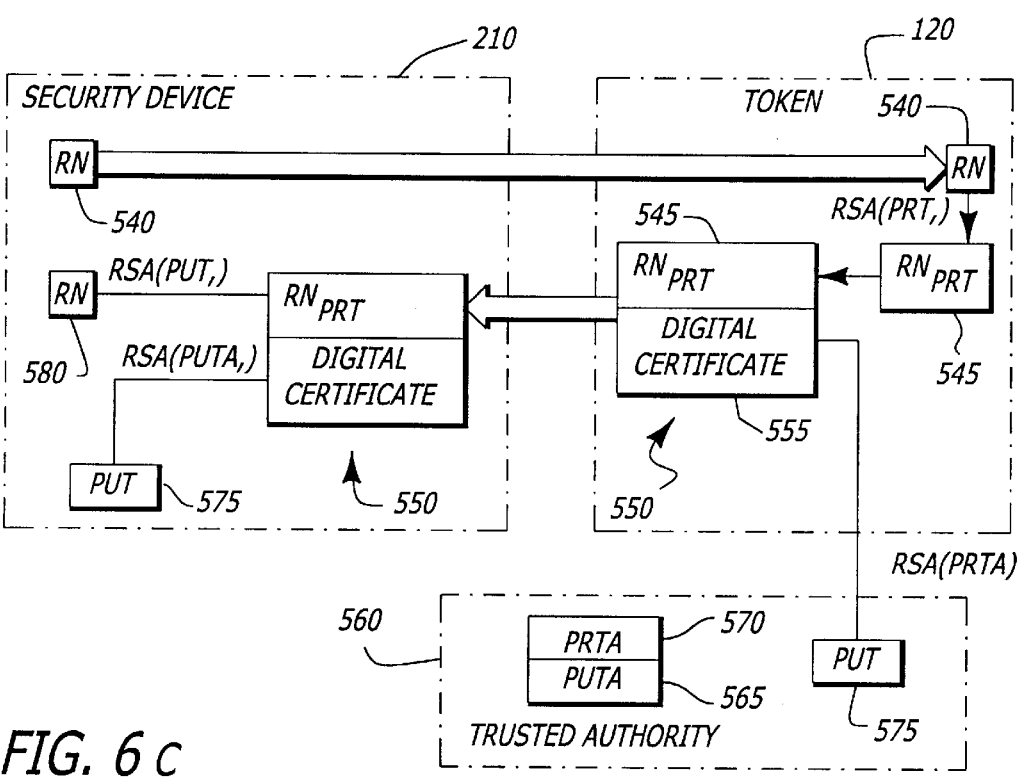

The periodic Challenge/Response message may be performed in a number of ways as shown in FIGS. 6A–6C. These are shown purely for clarification; other means of authentication may be used without deviating from the spirit of this invention. For example, the node, namely the security device 210, may generate a random number ("RN") 500 and transmit RN 500 in a non-encrypted format as a Challenge message to the token 120. Upon receiving the Challenge message, the token 120 encrypts RN 500 with its private key "PRT", forming a Response message 505 and returns the Response message 505 back to the security device 210. Thereafter, the security device 210 decrypts the Response message 505 with a public key of the token "PUT" and checks to verify that the random number received ("$RN_{rec}$") 510 is equivalent to RN 500.

Another example is that the security device 210 may produce a Challenge message 525 by generating a random number "RN" 520 and encrypting RN 520 with the token's public key "PUT" stored within the security device 210. Thereafter, the Challenge message 525 is transmitted to the token 120. Upon receiving the Challenge message 525, the token 120 decrypts the Challenge message 525 with its private key "PRT" to retrieve the random number "$RN_{trmt}$" 530. Thereafter, $RN_{trmt}$ 530 is transmitted back to the security device 210 and compared with RN 520 previously transmitted to determine if they are equivalent. If so, the user is provided access to the data stored within the node and if not, the user is prevented such access.

Another illustrative example is shown in FIG. 6C where the security device 210 is not designed to store any public keys associated with authorized tokens. As a result, a digital certificate is required as shown. The security device 210 transmits a random number ("RN") 540 to the token 120. The token 120 receives RN 540 and encrypts RN 540 with the private key of the token "PRT" to produce an encrypted random number "$RN_{prt}$" 545 as part of a Response message 550. The other part of the Response message 550 is a digital certificate 555 obtained from a well-known Trusted Authority 560 (e.g., system administrator, company security, etc.) in which its public key "PUTA" 565 is widely disseminated. The digital certificate 555 is the public key of the token ("PUT") 575 encrypted with the private key of the Trusted Authority "PRTA" 570. Both parts of the Response message 550 are transmitted to the security device 210.

Upon receiving the Response message 550, the security device 210 decrypts the digital certificate 555 with PUTA 565 to obtain PUT 575. Next, PUT 575 is used to decrypt $RN_{prt}$ 545. Finally, RN 580 received from the token is compared to RN 540 transmitted to the token 120 and if these numbers are equivalent, the Response message 550 is correct.

Alternatively, in lieu of a password-based system being implemented within the node, the token may be configured to require a password or a personal identification number ("PIN"). Thus, the token remains in an inactive state unless its user periodically authenticates himself or herself. Of course, the advantage of having the password-based system employed within the node is that the node is already adapted with I/O devices (e.g., an alphanumeric keyboard) to assist a user in authenticating himself or herself. However, as stated previously, the node is susceptible to virus attacks which would not be an issue if the password-based system is employed within the token. In this embodiment, the token requires periodic password or personal identification number ("PIN") authentication by the user so that if the token is lost or misplaced, it cannot be used by an unauthorized user once the token becomes inactive by failure to timely provide authentication information. It is plausible that the token may employ a type of biometric measurement device in lieu of a password-based system. For example, a thumbprint or fingerprint reader could be integrated into the token requiring the authorized user to periodically (e.g., sample at predetermined times or every hour, day, etc.) to ensure that the token itself cannot be used if it is lost. There are a few companies such as Digital Pathways and Security Dynamics that have developed tokens that require user authentication to operate. However, these tokens do not lend themselves to periodic authentication through Challenge and Response messages as illustrated above.

Figure 7:
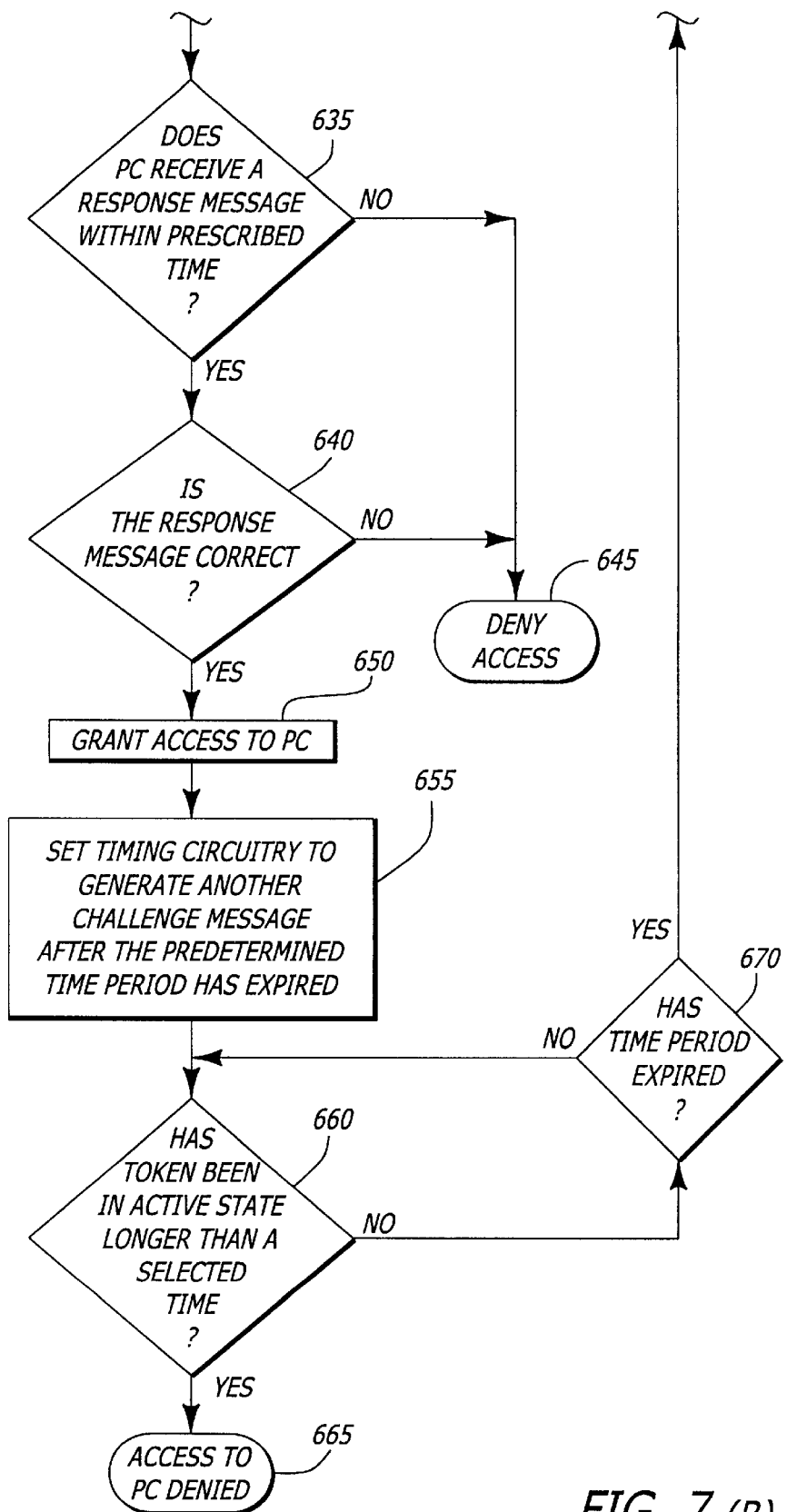
FIGS. 7(A) and 7(B) are an illustrative embodiment of the operations for configuring the token to provide security against the unauthorized access of the node.

Referring now to FIGS. 7(A) and 7(B), the operations of the token implemented with a password-based system are illustrated below. First, in Step 600, at a periodic interval, the user provides authentication information to the token. If the authentication information is correct, the token is functional and exists in an active state (Steps 605–610). Thereafter, after a preselected period of time has elapsed, the token enters into an invalid state which requires the user to enter authentication information into the token again (Step 615). Otherwise, if the user authentication information is incorrect, the token remains nonfunctional (Step 615).

In the event that the token is in an active state, the token receives a query signal from the node once it is carried or worn within a predetermined distance from the node (Step 620). In that event, the token responds to the query with an identification message indicating the identity of the user (Step 625). Next, in Step 630, upon receiving the identification message from the token, the node generates and transmits a Challenge message directed to that token. Thereafter, the node awaits a Response message within a prescribed time period. If the node does not receive a Response message within that time or receives an incorrect Response message, access is denied to the node (Steps 635–645). However, if the node receives the Response message within the prescribed period of time and it is correct, the user is granted access to the node (Step 650).

Thereafter, timing circuitry within the node is set for the node to generate another Challenge message after a predetermined time period has expired (Step 655). Next, the token is checked to see whether it has been in the active state for longer than the selected time (Step 660). If so, the token becomes nonfunctional and the user is denied access to the node (Step 665). If the token is still active, the timing circuitry of the node is checked to see whether the predetermined time period has expired (Step 670). If not, the state of the token and expiration of the time period set by the timing circuitry in the node is checked at a later time. Otherwise, if the timing period has expired, the node is prompted to generate another Challenge message to the token for periodic authentication that the user is proximate to the node.

While various embodiments of the invention have been described, those skilled in the art will realize that other embodiments of the invention are easily foreseeable without departing from the spirit and scope of the present invention. For example, the token may initiate query messages to allow the node to determine when the token is in the proximity. Likewise, the periodic challenge/response communications may be initiated by the token rather than the node so long as the node still authenticates the token. Moreover, well known circuitry and operational steps are not set forth in detail in order to avoid unnecessarily obscuring the present invention. The invention should, therefore, be measured in terms of the following claims.

What is claimed is:

1. A method to control an operating state of a node, the method comprising:

authenticating a token by a user inputting data into the token;

authenticating a node by exchanging messages between the token possesed by the user and the node, periodically performing the message exchange to ascertain whether the token is within a predetermined distance from the node, and disabling at least one peripheral device of the node in order to place the node into a non-operational state if the token is determined to be outside a range established by the predetermined distance; and periodically authenticating the token by requiring the user to input the data into the token.

2. The method according to claim 1, wherein the node includes a computer.

3. The method according to claim 2, wherein the at least one peripheral device includes one of a keyboard and a mouse.

4. The method according to claim 1, wherein the authentication of the token further includes entering of a subsequently verified alphanumeric password by the user to activate the token.

5. The method according to claim 4, wherein the periodic authentication of the token includes reloading of the alphanumeric password after a prescribed time period has elapsed to reactive the token.

6. The method according to claim 1, wherein the authentication of the token includes providing biometric data of the user and determining that the biometric data matches characteristics of an authorized user.

7. The method according to claim 1, wherein the node includes a door control mechanism.

8. The method according to claim 1, wherein the periodicity of the first and second message exchanges is programmable.

9. The method according to claim 1, wherein prior to exchanging the messages, the method comprises:
transferring a query message from the node to the token; and
transferring a response to the node by the token when the token is within the predetermined distance from the node.

10. The method according to claim 1, wherein prior to exchanging the messages, the method further comprises
transferring a query message from the token to the node; and
transferring a response message from the node to the token indicating that the node acknowledges that the token is within the predetermined distance.

11. The method according to claim 1 further comprising periodically authenticating the token to ensure that the token is being used by the authorized user.

12. A method to control an operating state of a node, the method comprising:
authenticating a user from loading alphanumeric data into a token and determining whether the alphanumeric data matches pre-stored alphanumeric data;
exchanging at least a first and second messages between the token and the node, the node being placed in an operational state if the second message correctly responds to the first message; and
periodically determining whether the token is within a predetermined distance from the node.

13. The method according to claim 12, wherein the periodic determination comprises
maintaining the node in the operational state if the token correctly responds due to a presence of the token within the predetermined distance;
placing the node in a non-operational state if the token fails to respond due to the presence of the token being more than the predetermined distance away from the node or the token responds incorrectly; and
periodically performing the authentication of the user to ascertain that the user in possession of the token is authorized to use the token.

14. The method according to claim 12, wherein the periodic determination comprises reloading the alphanumeric data by the user.

15. A wireless authentication system comprising:
a computer including a peripheral device;
a security device having a wireless transceiver, the security device, including a package containing both (i) a processing unit and (ii) a memory unit coupled to the processing unit, to generate a plurality of messages to be transmitted through the wireless transceiver, each of the plurality of messages is separately transmitted after a prescribed time interval has elapsed; and
a token to establish a wireless communication link with the security device, to operate in combination with the security device to respond to the plurality of messages in order to place the computer in an operational state using the plurality of messages when the token is within a predetermined distance from the computer, to place the computer in a non-operational state by disabling the peripheral device, and to authenticate a user of the token by periodically notifying the user to input information therein.

16. The wireless authentication system according to claim 15, wherein each of the plurality of messages generated by the security device is separately transmitted after the prescribed time interval has elapsed.

17. The wireless authentication system according to claim 16, wherein the token (i) initially receives a first message of the plurality of messages, (ii) generates a message in response to the first message for transmission to the security device to place the computer in the operational state and (iii) generates a message in response to each of the plurality of messages subsequent to the first message as long as the token remains within the predetermined distance from the security device.

18. The wireless authentication system according to claim 15, wherein the security device further includes a random number generator coupled to the processing unit, the random number generator contained in the package.

19. The wireless authentication system according to claim 15, wherein the token includes
a second data bus;
a wireless interface in communication with the second data bus, the wireless interface is further coupled to the wireless transceiver of the security device through the wireless communication link to receive the plurality of messages and to transmit a corresponding plurality of messages in response to the plurality of messages from the security device;
a memory element coupled to the second data bus, the memory element to contain cryptographic information; and
a processor coupled to the second data bus, the processor to generate the corresponding plurality of messages in response to the plurality of messages.

20. The wireless authentication system according to claim 19, wherein the token further includes a power source to provide power to at least the memory element and the processor.

21. The wireless authentication system according to claim 15, wherein the peripheral device includes one of a keyboard and a mouse.

22. A wireless authentication system comprising:
a computer including
a transmitter,
a receiver, and
a security device including a processing unit and a memory unit; and
a token in bi-directional communications with the transmitter and receiver of the computer, the token operating in combination with the security device to place the computer in an operational state when the token is determined to be within a predetermined distance from the computer, and to place the computer in a non-operational state when the token is determined to be more than the predetermined distance from the computer, the token further authenticating its user by comparing input data received with a prestored master after a period of time has elapsed.

23. The wireless authentication system according to claim 22, wherein the token includes a biometric measurement device to periodically authenticate a user of the token by inputting the data, being biometric data of the user, into the token.

24. A method to control an operating state of a node, the method comprising:

activating a token;

placing a node into either (i) an operational state if the token is determined to be within a predetermined distance from the node, or (ii) an non-operational state when the token is determined to be located more than the predetermined distance from the node; and re-authenticating the user of the token by periodically requiring the user to input predetermined data into the token.

25. The method according to claim 24, wherein the placing of the node into an operational state further includes responding to a query message from the node by the token returning a response that correctly responds to the query message.

26. The method according to claim 24, wherein the predetermined data input into the token includes a subsequently verified alphanumeric password.

27. The method according to claim 26, wherein the reauthentication of the user includes reloading of the alphanumeric password after a prescribed time period has elapsed in order to continue activation of the token.

28. The method according to claim 24, wherein the predetermined data input into the token includes biometric data of the user.

29. The method according to claim 24, wherein the activation of the token occurs after a user of the token is authenticated based on the predetermined data input into the token by the user.

30. The method according to claim 24, wherein the node includes a door control mechanism.

31. The method according to claim 24, wherein the periodicity in reauthenticating the user is programmable.

32. The method according to claim 24, wherein the placing of the node into an operational state further includes issuing a query message by the token to the node; and receiving a response message by the token indicating that the node acknowledges that the token within the predetermined distance from the node.

33. A method to control an operating state of a node, the method comprising:

activating a token upon authentication of the user by loading alphanumeric data into the token and determining that the alphanumeric data matches pre-stored alphanumeric data;

determining a state of the node by exchanging at least a first message and a second message between the token and the node, the node being placed in an operational state if the second message correctly responds to the first message; and periodically authenticating that the user is in possession of the token.

34. The method according to claim 33, wherein the periodic authentication of the node further determines that the token is within a predetermined distance from the node.

35. The method according to claim 33, wherein the periodic authentication of the node further determines that the user of the token is authorized to access the node.

36. The method according to claim 33, wherein the periodic authentication of the token comprises reloading data by the user for authentication of the user.

37. The-method according to claim 36, wherein the data is alphanumeric data for comparison with pre-stored data.

38. The method according to claim 36, wherein the data includes biometric data for comparison with pre-stored characteristics of at least one authorized user.

39. A token comprising:

an interface to support wireless communications with a node;

a memory element; and a processor coupled to the memory element and the interface, the processor to authenticate a user of the token by periodically notifying the user to input information therein and to exchange messages with the node in order to place the node in an non-operational state when the token is determined to be greater than a predetermined distance away from the node.

40. The token according to claim 39, wherein the wireless communications are messages in a radio frequency format.

41. The token according to claim 39, wherein the processor places the node in the non-operational state by disabling at least one peripheral device of the node.

42. The token according to claim 39, wherein the at least one peripheral device includes a keyboard.

43 A node comprising:

a peripheral device;

a security device having a wireless transceiver and in control of the node, the security device to transmit a plurality of messages, each of the plurality of messages is separately transmitted to a mobile token after a prescribed time interval has elapsed in order to determine whether the token is within a predetermined distance from the security device and to maintain the node in an operational state if the token is authenticated and is determined to be within a predetermined distance from the security device.

44. The node according to claim 43, wherein the security device to alter the node from the operational state to a non-operational state if the token is determined to be farther from the security device than the predetermined distance.

45. The node according to claim 44, wherein the security device alters the node to the non-operational state if the token is not authenticated.

46. The node according to claim 43, wherein the security device alters the node to the non-operational state if the token is not authenticated.

47. The node according to claim 43 is a computer.

* * * * *